(12) United States Patent
Gooding

(10) Patent No.: US 8,813,037 B2
(45) Date of Patent: *Aug. 19, 2014

(54) DEBUGGING A HIGH PERFORMANCE COMPUTING PROGRAM

(71) Applicant: International Business Machines Corporation, Armonk, NY (US)

(72) Inventor: Thomas M. Gooding, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/780,215

(22) Filed: Feb. 28, 2013

(65) Prior Publication Data

US 2013/0179866 A1 Jul. 11, 2013

Related U.S. Application Data

(63) Continuation of application No. 11/360,346, filed on Feb. 23, 2006, now Pat. No. 8,516,444.

(51) Int. Cl.
*G06F 9/44* (2006.01)

(52) U.S. Cl.
USPC ........... 717/125; 717/124; 717/126; 717/127; 717/128; 717/129

(58) Field of Classification Search
None
See application file for complete search history.

(56) References Cited

U.S. PATENT DOCUMENTS

| | | | |
|---|---|---|---|
| 4,245,344 A | 1/1981 | Richter | |
| 4,634,110 A | 1/1987 | Julich et al. | |
| 4,860,201 A | 8/1989 | Stolfo et al. | |
| 5,333,268 A | 7/1994 | Douglas et al. | |
| 5,729,756 A | 3/1998 | Hayashi | |
| 5,821,937 A | 10/1998 | Tonelli et al. | |
| 5,918,005 A | 6/1999 | Moreno et al. | |
| 5,941,992 A | 8/1999 | Croslin et al. | |
| 5,953,347 A | 9/1999 | Wong et al. | |
| 5,953,530 A | 9/1999 | Rishi et al. | |
| 6,047,122 A | 4/2000 | Spiller | |
| 6,205,532 B1 | 3/2001 | Carvey et al. | |
| 6,449,667 B1 | 9/2002 | Ganmukhi et al. | |
| 6,813,240 B1 | 11/2004 | Shah | |
| 6,848,062 B1 | 1/2005 | Desai et al. | |
| 6,880,100 B2 | 4/2005 | Mora et al. | |
| 6,892,329 B2 | 5/2005 | Bruckman | |
| 6,912,196 B1 | 6/2005 | Mahalingaiah | |
| 7,007,189 B2 | 2/2006 | Lee et al. | |
| 7,027,413 B2 | 4/2006 | Lee et al. | |
| 7,028,225 B2 | 4/2006 | Maso et al. | |

(Continued)

OTHER PUBLICATIONS

Stallman, Richard M. GDB Manual—The GNU Source-Level Debugger. [online] (Oct. 1989). Free Software Foundation, Inc., pp. 1-78. Retrieved From the Internet <http://www.cs.cmu.edu/afs/cs/usr/bovik/OldFiles/vax_u13/omega/usr/mach/doc/gdb.ps>.

(Continued)

*Primary Examiner* — Emerson Puente
*Assistant Examiner* — Jonathan R Labud
(74) *Attorney, Agent, or Firm* — Biggers Kennedy Lenart Spraggins, LLP

(57) ABSTRACT

Methods, apparatus, and computer program products are disclosed for debugging a high performance computing program by gathering lists of addresses of calling instructions for a plurality of threads of execution of the program, assigning the threads to groups in dependence upon the addresses, and displaying the groups to identify defective threads.

12 Claims, 6 Drawing Sheets

(56) References Cited

U.S. PATENT DOCUMENTS

| | | |
|---|---|---|
| 7,080,156 B2 | 7/2006 | Lee et al. |
| 7,149,920 B2 | 12/2006 | Blumrich et al. |
| 7,200,118 B2 | 4/2007 | Bender et al. |
| 7,210,088 B2 | 4/2007 | Chen et al. |
| 7,289,428 B2 | 10/2007 | Chow |
| 7,382,734 B2 | 6/2008 | Wakumoto et al. |
| 7,451,340 B2 | 11/2008 | Doshi et al. |
| 7,461,236 B1 | 12/2008 | Wentzlaff |
| 7,505,414 B2 | 3/2009 | Nakashima et al. |
| 7,506,197 B2 | 3/2009 | Archer et al. |
| 7,529,963 B2 | 5/2009 | Archer et al. |
| 7,571,345 B2 | 8/2009 | Archer et al. |
| 7,600,095 B2 | 10/2009 | Archer et al. |
| 7,646,721 B2 | 1/2010 | Archer et al. |
| 7,669,075 B2 | 2/2010 | Archer et al. |
| 2002/0152432 A1 | 10/2002 | Fleming |
| 2002/0188930 A1 | 12/2002 | Moser et al. |
| 2003/0055932 A1 | 3/2003 | Brisse |
| 2003/0061265 A1 | 3/2003 | Maso et al. |
| 2004/0078493 A1 | 4/2004 | Blumrich et al. |
| 2004/0090925 A1 | 5/2004 | Schoeberl et al. |
| 2004/0153754 A1 | 8/2004 | Chen et al. |
| 2004/0181707 A1 | 9/2004 | Fujibayashi |
| 2004/0205237 A1 | 10/2004 | Doshi et al. |
| 2004/0223463 A1 | 11/2004 | MacKiewich et al. |
| 2005/0041600 A1 | 2/2005 | Moffatt et al. |
| 2005/0095008 A1 | 5/2005 | DeCusatis et al. |
| 2005/0120273 A1 | 6/2005 | Hudson et al. |
| 2005/0131865 A1 | 6/2005 | Jones et al. |
| 2005/0132163 A1 | 6/2005 | Stockmeyer |
| 2005/0246569 A1 | 11/2005 | Ballew et al. |
| 2005/0259587 A1 | 11/2005 | Wakumoto et al. |
| 2006/0023639 A1 | 2/2006 | Bohannon et al. |
| 2006/0101104 A1 | 5/2006 | Bhanot et al. |
| 2006/0179269 A1 | 8/2006 | Archer et al. |
| 2007/0174558 A1 | 7/2007 | Jia et al. |
| 2007/0234294 A1 | 10/2007 | Gooding et al. |
| 2007/0242609 A1 | 10/2007 | Archer et al. |
| 2007/0242611 A1 | 10/2007 | Archer et al. |
| 2007/0242685 A1 | 10/2007 | Archer |
| 2007/0245122 A1 | 10/2007 | Archer et al. |
| 2007/0260909 A1 | 11/2007 | Archer et al. |
| 2008/0072101 A1 | 3/2008 | Archer et al. |
| 2008/0253386 A1 | 10/2008 | Barum |
| 2008/0259816 A1 | 10/2008 | Archer et al. |
| 2008/0263320 A1 | 10/2008 | Archer et al. |
| 2008/0263329 A1 | 10/2008 | Archer et al. |
| 2008/0263387 A1 | 10/2008 | Darrington et al. |
| 2008/0270998 A1 | 10/2008 | Zambrana |
| 2008/0313506 A1 | 12/2008 | Archer et al. |
| 2009/0016332 A1 | 1/2009 | Aoki et al. |
| 2009/0037773 A1 | 2/2009 | Archer et al. |
| 2013/0018935 A1 | 1/2013 | Archer et al. |
| 2013/0081037 A1 | 3/2013 | Archer et al. |

OTHER PUBLICATIONS

Final Office Action, U.S. Appl. No. 11/360,346, Jul. 23, 2010, pp. 1-15.
Final Office Action, U.S. Appl. No. 11/360,346, Mar. 22, 2012, pp. 1-13.
Office Action, U.S. Appl. No. 11/360,346, Mar. 8, 2010, pp. 1-94.
Office Action, U.S. Appl. No. 11/360,346, Oct. 7, 2011, pp. 1-14.
Notice of Allowance, U.S. Appl. No. 11/260,346, Nov. 23, 2012, pp. 1-9.
Adiga et al., "An Overview of the BlueGene/L Supercomputer", Supercomputing, ACM/IEEE 2002 Conference, Nov. 2002, pp. 1-22, IEEE Xplore Digital Library, USA, DOI: 10.1109/SC.2002.10017.
Final Office Action, U.S. Appl. No. 11/279,573, Oct. 28, 2009, 1-15.
Final Office Action, U.S. Appl. No. 11/279,579, Sep. 4, 2009, 1-36.
Notice of Allowance, U.S. Appl. No. 11/279,592, Nov. 2, 2009, 1-13.
Office Action, U.S. Appl. No. 11/279,573, Nov. 12, 2008, 1-20.
Office Action, U.S. Appl. No. 11/279,573, Apr. 15, 2009, 1-22.
Office Action, U.S. Appl. No. 11/279,579, Nov. 12, 2008, 1-20.
Office Action, U.S. Appl. No. 11/279,579, Apr. 15, 2009, 1-30.
Office Action, U.S. Appl. No. 11/279,586, Jan. 9, 2009, 1-17.
Office Action, U.S. Appl. No. 11/279,592, Nov. 18, 2008, 1-16.
Office Action, U.S. Appl. No. 11/279,592, Apr. 29, 2009, 1-15.
Notice of Allowance, U.S. Appl. No. 11/279,586, Jun. 30, 2009, 1-06.
Office Action, U.S. Appl. No. 11/832,940, Mar. 29, 2010, 1-11.
Office Action, U.S. Appl. No. 11/737,229, Oct. 6, 2010, 1-16.
Final Office Action, U.S. Appl. No. 11/737,229, Feb. 16, 2011, 1-18.
Final Office Action, U.S. Appl. No. 11/360,346, Mar. 22, 2012, 1-13.

DEBUGGING A HIGH PERFORMANCE COMPUTING PROGRAM

CROSS-REFERENCE TO RELATED APPLICATION

This application is a continuation application of and claims priority from U.S. patent application Ser. No. 11/360,346, filed on Feb. 23, 2006.

STATEMENT REGARDING FEDERALLY SPONSORED RESEARCH OR DEVELOPMENT

This invention was made with Government support under Contract No. B519700 awarded by the Department of Energy. The Government has certain rights in this invention.

BACKGROUND OF THE INVENTION

1. Field of the Invention

The field of the invention is data processing, or, more specifically, methods, apparatus, and computer program products for debugging a high performance computing program.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

As computer software has become more sophisticated, the complexity of developing computer software has also increased. Increased complexity of computer software often produces defects in the software that a developer must identify and correct, such as, for example, generating incorrect output or hanging during execution. Generating incorrect data may result from incorrect input or bad data processing. Computer software that hangs during execution most often results from a bad calling sequence among the program subroutines.

When computer software hangs during execution, a developer typically needs to obtain an overview of the state of the entire software program in order to identify the specific cause of the software defect. To obtain such an overview, a developer often utilizes computer software called a 'debugger.' A debugger is used to analyze software defects or to optimize performance of other computer software. A debugger allows a user to follow the flow of program execution and inspect the state of a program at any point by controlling execution of the program being debugged. A debugger typically allows a user to track program variables, execute a thread of execution step by step, stop execution of a thread at a particular line number in computer source code, stop execution of a thread when certain conditions are satisfied, or examine a thread's calling sequence of subroutines.

Current debuggers adequately aid a developer in debugging a computer software program composed of a relatively small number of threads of execution such as, for example, software programs executing on single processor or small multi-processor computer systems. Current debugger, however, do not provide a developer an efficient mechanism for debugging a special class of computer software programs called high performance computing programs. A high performance computing program is a computer software program composed of a massive number of threads of execution. Typically, each thread of a high performance computing environment executes on a dedicated processor such that the threads of a high performance computing program execute in parallel on a massive number of processors to solve a common problem. Current debuggers do not provide adequate means of debugging these high performance computing programs because these debuggers are not aware that the threads of a high performance computing program often perform similar operations. Consequently, current debuggers require a developer to manually sort through individual threads of execution to identify the defective threads. Often a high performance computing program may, however, contain over one hundred thirty thousand threads of execution such as, for example, a high performance computing program executing on the IBM® BlueGene/L supercomputer. Such a high performance computing program makes manually identifying defective threads a near impossible task.

In response to the challenges associated with debugging a computer program composed of numerous threads of execution, some current debuggers implement the concept of thread groups based on the type classification of the thread under execution. In typical high performance computing programs, however, most of the threads have the same "worker-thread" type classification. As such, the benefits of having groups based on a type classification of a thread often do not accrue to developers debugging a high performance computing program.

SUMMARY OF THE INVENTION

Methods, apparatus, and computer program products are disclosed for debugging a high performance computing program by gathering lists of addresses of calling instructions for a plurality of threads of execution of the program, assigning the threads to groups in dependence upon the addresses, and displaying the groups to identify defective threads.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Detailed Description

Figure 1:
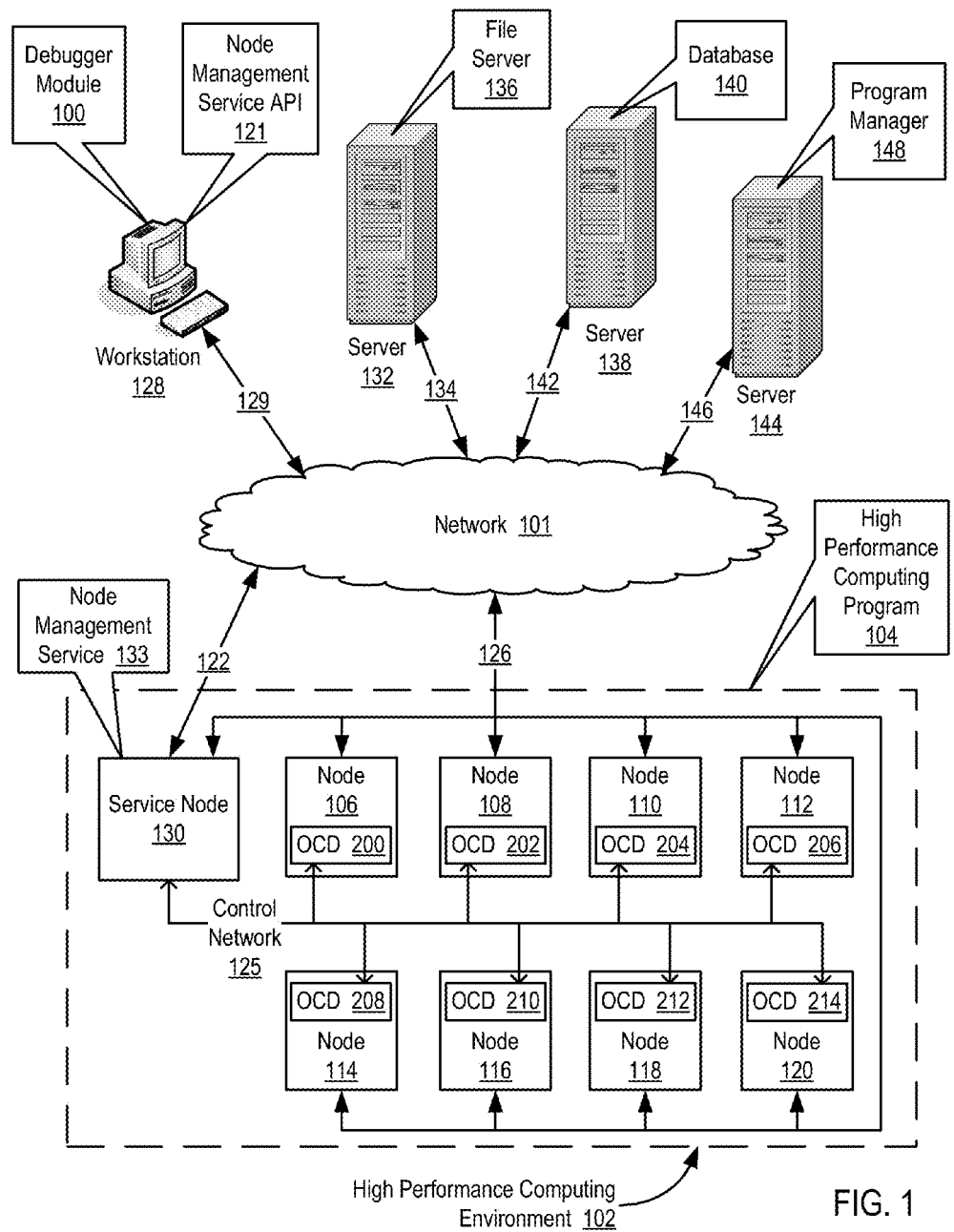
FIG. 1 sets forth a network diagram illustrating an exemplary system for debugging a high performance computing program according to embodiments of the present invention.

Exemplary methods, apparatus, and products for debugging a high performance computing program according to embodiments of the present invention are described with reference to the accompanying drawings, beginning with FIG. 1. FIG. 1 sets forth a network diagram illustrating an exemplary system for debugging a high performance computing program according to embodiments of the present invention. The system of FIG. 1 operates generally for debugging a high performance computing program according to embodiments of the present invention by gathering lists of addresses of calling instructions for a plurality of threads of execution of the program, assigning the threads to groups in dependence upon the addresses, and displaying the groups to identify defective threads. The system of FIG. 1 also operates generally for debugging a high performance computing program according to embodiments of the present invention by inferring function names associated with the current values of program counters for a plurality of threads of the program. The system of FIG. 1 also operates generally for debugging a high performance computing program according to embodiments of the present invention by inferring function names and line numbers in source code associated with the current values of program counters for a plurality of threads of the program.

Debugging a high performance computing program according to embodiments of the present invention occurs using a debugger. A debugger is a computer program that is used to analyze software defects in another computer program or to optimize performance of another computer program. A debugger assists in the analysis of software defects and optimization of performance by controlling a computer processor's execution of a computer program. Examples of debuggers that may be improved to operate according to embodiments of the present invention include the GNU Project Debugger, the Absoft Fx2™ Debugging Solution, the Etnus TotalView® Debugger, or any other debugger as will occur to those of skill in the art. The example system of FIG. 1 includes a high performance computing program (104) executing in a high performance computing environment (102). A high performance computing program is computer program instructions for data processing implementing a massive number of threads of execution for parallel processing in a high performance computing environment. A thread of execution is a sequence of computer program instructions executed by a computer processor. A high performance computing environment is massively parallel computer hardware operating to simultaneously execute a plurality of threads of execution using a massive number of processing nodes. A high performance computing environment may include, for example, computer clusters, computing grids, supercomputers, and so on.

In the system of FIG. 1, the high performance computing environment (102) includes nodes (106-120) connected to network (101) through wireline connection (126). Each node (106-120) is an embedded computer system that consists of at least one processor, computer memory, and a link to a network that connects the nodes (106-120) together. Nodes (106-120) communicate with each other by passing messages developed using a programming model such as, for example, the Message Passing Interface ('MPI'), OpenMP model, the Unified Parallel C ('UPC') model, and so on. In the example of FIG. 1, each node (106-120) simultaneously executes a thread of the high performance computer program (104) assigned for execution in the high performance computing environment by a program manager (148).

Embedded computer systems, such as nodes (106-120) in the example of FIG. 1, present special problems for a software developer because embedded systems lack keyboards, screens, disk-drives, and other helpful user interfaces and storage devices that typically aid a developer in debugging a program. In the example system of FIG. 1, therefore, each node (106-120) includes an On-Chip Debugger ('OCD') (200-214). Each OCD (200-214) is computer hardware generally used to monitor and control nodes (106-120). Specifically, each OCD (200-214) controls a node's execution of a thread of execution. An OCD controls a node's execution of the thread by reading and writing data into registers and memory locations of a node and by operating hardware interrupts on the node.

In the system of FIG. 1, the high performance computing environment (102) also includes service node (130) connected to network (101) through wireline connection (122) and connected to OCDs (200-214) through control network (125). Service node (130) is an embedded computer system having installed upon it node management services (133). The node management service (133) is computer program instructions for managing nodes (106-120). In the example system of FIG. 1, the node management service (133) manages nodes (106-120) using OCDs (200-214). Using OCDs (200-214), the node management service (133) operates generally for booting nodes (106-120), installing software on nodes (106-120), monitoring nodes (106-120), and controlling program execution on nodes (106-120). The node management service (133) communicates with the OCDs (200-214) through a data communications connection implemented using, for example, the Joint Test Action Group ('JTAG') protocol.

JTAG is the IEEE 1149.1 standard entitled "Standard Test Access Port and Boundary-Scan Architecture" for testing and debugging printed circuit boards, integrated circuits, and embedded systems using boundary scan technology. First standardized in 1990, the electronics industry has widely adopted JTAG. Although JTAG was designed for printed circuit boards, JTAG is primarily used for testing sub-blocks of integrated circuits and serves as a useful mechanism for debugging embedded systems by providing a convenient 'back door' into the system. Using the backdoor created by the JTAG protocol, the node management service (133) may manage nodes (106-120) by reading or writing to any address in the computer memory of nodes (106-120), reading or writing to any register in the processors of nodes (106-120), and sending interrupts to suspend and reset the processors of node (106-120). Although the connection between the node management service (133) and nodes (106-120) is described with reference to a JTAG connection, such description is for explanation and not for limitation. The node management service (133) may also communicate with nodes (106-120) using other communications protocols useful in debugging a high performance computing program such as, for example, the Inter-Integrated Computer ('I²C') Bus protocol.

The system of FIG. 1 also includes a workstation (128) connected to network (101) through wireline connection (129). The workstation (128) has installed upon it a debugger module (100). The debugger module (100) is a set of computer program instructions for debugging a high performance computing program according to embodiments of the present invention. In the example of FIG. 1, the debugger module (100) operates generally by gathering lists of addresses of calling instructions for a plurality of threads of execution of the program, assigning the threads to groups in dependence upon the addresses, and displaying the groups to identify defective threads. The debugger module (100) also operates generally by inferring function names associated with the current values of the program counters for threads of execution of the program. The debugger module (100) also operates generally by inferring function names and line numbers in source code associated with the current values of the program counters for threads of execution of the program.

In the example of FIG. 1, the debugger module (100) debugs the high performance computing program (104) through the node management service (133) installed on the service node (130). The debugger module (100) communicates with the node management service (133) through a Node Management Service Application Programming Interface ('API') provided by the node management service (133). The Node Management Service API ('API') (121) provides functions to the debugger module (100) for controlling nodes (106-120) that read or write to any address in the computer memory of nodes (106-120), that read or write to any register in the processors of nodes (106-120), and that send interrupts to suspend and reset the processors of node (106-120).

The Node Management Service API (121) may be implemented as functions contained in dynamically linked libraries or statically linked libraries available to the debugger module (100). Implementations of the Node Management Service API (121) used by debugger module (100) may communicate with the node management service (133) through network (101) by calling member methods of a CORBA object or member methods of remote objects using the Java Remote Method Invocation ('RMI') Application Programming Interface ('API').

'CORBA' refers to the Common Object Request Broker Architecture, a computer industry specifications for interoperable enterprise applications produced by the Object Management Group ('OMG'). CORBA is a standard for remote procedure invocation first published by the OMG in 1991. CORBA can be considered a kind of object-oriented way of making remote procedure calls, although CORBA supports features that do not exist in conventional RPC. CORBA uses a declarative language, the Interface Definition Language ("IDL"), to describe an object's interface. Interface descriptions in IDL are compiled to generate 'stubs' for the client side and 'skeletons' on the server side. Using this generated code, remote method invocations effected in object-oriented programming languages, such as C++ or Java, look like invocations of local member methods in local objects.

The Java Remote Method Invocation API is a Java application programming interface for performing remote procedural calls published by Sun Microsystems. The Java RMI API is an object-oriented way of making remote procedure calls between Java objects existing in separate Java Virtual Machines that typically run on separate computers. The Java RMI API uses a remote interface to describe remote objects that reside on the server. Remote interfaces are published in an RMI registry where Java clients can obtain a reference to the remote interface of a remote Java object. Using compiled 'stubs' for the client side and 'skeletons' on the server side to provide the network connection operations, the Java RMI allows a Java client to access a remote Java object just like any other local Java object.

The system of FIG. 1 includes server (144) connected network (101) through wireline connection (146). Server (144) has installed upon it a program manager (148). The program manager (148) is computer program instructions that manage the execution of the high performance computing program (104) across the nodes (106-120) of the high performance computing environment (102). In the example of FIG. 1, the program manager (148) assigns a thread of the high performance computing program (104) to each node (106-120) for execution in the high performance computing environment (102).

The system of FIG. 1 also includes server (132) connected to network (101) through wireline connection (134). Server (132) has installed upon it a file server (136). The file server (136) is computer program instructions that manage the access to files hosted on server (132) by the nodes (106-120, 130) in the high performance computing environment (102).

The system of FIG. 1 also includes server (138) connected to network (101) through wireline connection (142). Server (138) has installed upon it a database (140). Database (140) contains configuration data representing all the hardware in the high performance computing environment (102), operational data representing programs and program history of programs assigned for execution in the high performance computing environment (102), environmental data representing current values for all the hardware components in the high performance computing environment (102), and error data representing hardware and software errors detected in the high performance computing environment (102).

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example the Transmission Control Protocol ('TCP'), the Internet Protocol ('IP'), the HyperText Transfer Protocol ('HTTP'), the Wireless Access Protocol ('WAP'), the Handheld Device Transport Protocol ('HDTP'), and others as will occur to those of skill in the art. Various embodiments of the present invention may be implemented on a variety of hardware platforms in addition to those illustrated in FIG. 1.

Debugging a high performance computing program in accordance with the present invention is generally implemented with computers, that is, with automated computing machinery. In the system of FIG. 1, for example, all the nodes, servers, and communications devices are implemented to some extent at least as computers. For further explanation, therefore, FIG. 2 sets forth a block diagram of automated computing machinery comprising an exemplary computer (152) useful in debugging a high performance computing program according to embodiments of the present invention. The computer (152) of FIG. 2 includes at least one computer processor (156) or 'CPU' as well as random access memory (168) ('RAM') which is connected through a system bus (160) to processor (156) and to other components of the computer.

Stored in RAM (168) is a debugger module (100), a set of computer program instructions for debugging a high performance computing program according to embodiments of the present invention. The debugger module (100) operates generally by gathering lists of addresses of calling instructions for a plurality of threads of execution of the program, assigning the threads to groups in dependence upon the addresses, and displaying the groups to identify defective threads. In addition, the debugger module (100) operates generally by inferring function names associated with the current values of the program counters for threads of execution of the program. The debugger module (100) also operates generally by inferring function names and line numbers in source code associated with the current values of the program counters for threads of execution of the program.

Also stored in RAM (168) is an operating system (154). Operating systems useful in computers according to embodiments of the present invention include UNIX™, Linux™, Microsoft XP™, AIX™, IBM's i5/OS™, and others as will occur to those of skill in the art. Operating system (154) and debugger module (100) in the example of FIG. 2 are shown in RAM (168), but many components of such software typically are stored in non-volatile memory (166) also.

Figure 2:
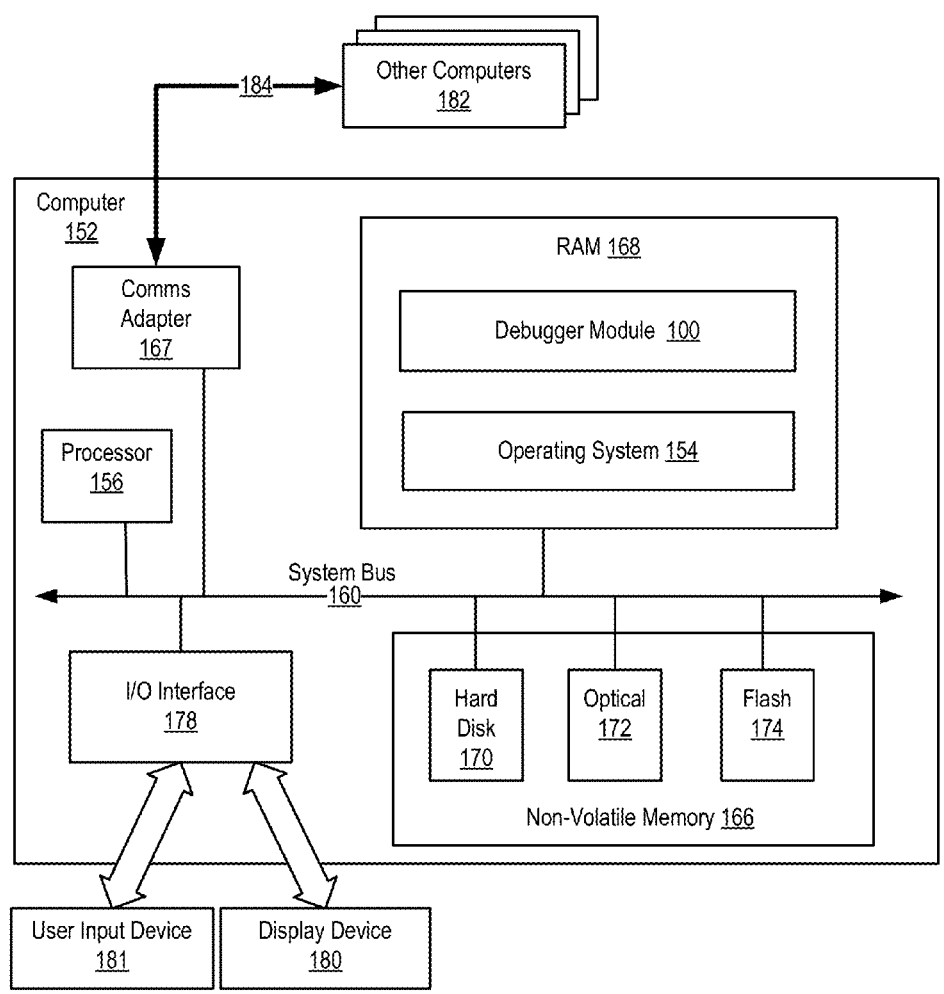
FIG. 2 sets forth a block diagram of automated computing machinery comprising an exemplary computer useful in debugging a high performance computing program according to embodiments of the present invention.

Computer (152) of FIG. 2 includes non-volatile computer memory (166) coupled through a system bus (160) to processor (156) and to other components of the computer (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (152) of FIG. 2 includes a communications adapter (167) for implementing data communications (184) with other computers (182). Such data communications may be carried out serially through RS-232 connections, through external buses such as the Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful for determining availability of a destination according to embodiments of the present invention include modems for wired dial-up communications, Ethernet (IEEE 802.3) adapters for wired network communications, and 802.11b adapters for wireless network communications.

Figure 3:
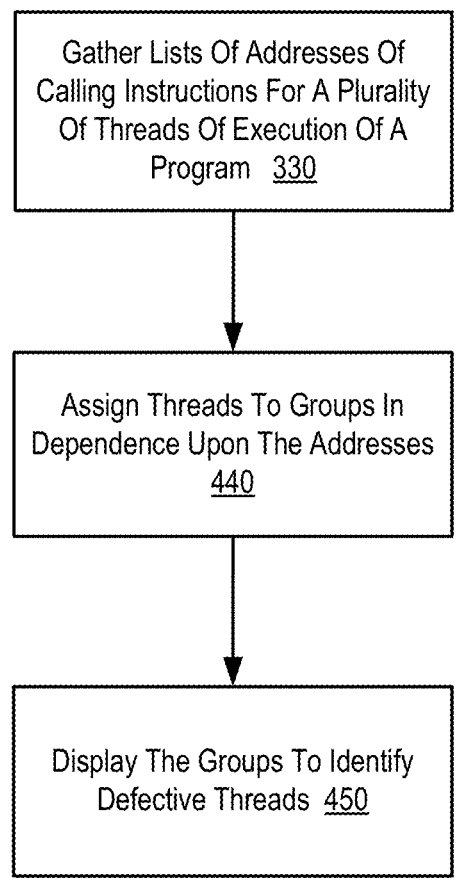
FIG. 3 sets forth a flow chart illustrating an exemplary method for debugging a high performance computing program according to embodiments of the present invention.

For further explanation, FIG. 3 sets forth a flow chart illustrating an exemplary method for debugging a high performance computing program according to embodiments of the present invention that includes gathering (330) lists of addresses of calling instructions for a plurality of threads of execution of the program, assigning (440) the threads to groups in dependence upon the addresses, and displaying (450) the groups to identify defective threads. In the example of FIG. 3, gathering (330) lists of addresses of calling instructions for a plurality of threads of execution of the program may be carried out by gathering stack tracebacks for a plurality of threads of execution of the program where each stack traceback includes a list of addresses of calling instructions as discussed with below reference to FIG. 4. Gathering (330) lists of addresses of calling instructions for a plurality of threads of execution of the program may also be carried out by retrieving current values of program counters for a plurality of threads of execution of the program at the time of gathering the stack tracebacks as discussed below with reference to FIG. 4.

In the example of FIG. 3, assigning (440) the threads to groups in dependence upon the addresses may be carried out by iteratively assigning to a group threads having identical subsets of the lists of addresses of calling instructions. Iteratively assigning to a group threads having identical subsets of the lists of addresses of calling instructions may be carried out as discussed below with reference to FIG. 5.

In the example of FIG. 3, displaying (450) the groups to identify defective threads may be carried out by displaying a group for an iteration and a count of the threads assigned to the group for the iteration as discussed below with reference to FIG. 5. Displaying (450) the groups to identify defective threads may also be carried out by inferring a function name associated with a calling instruction address located at a position in a list corresponding to an iteration as discussed below with reference to the FIG. 5.

Figure 4:
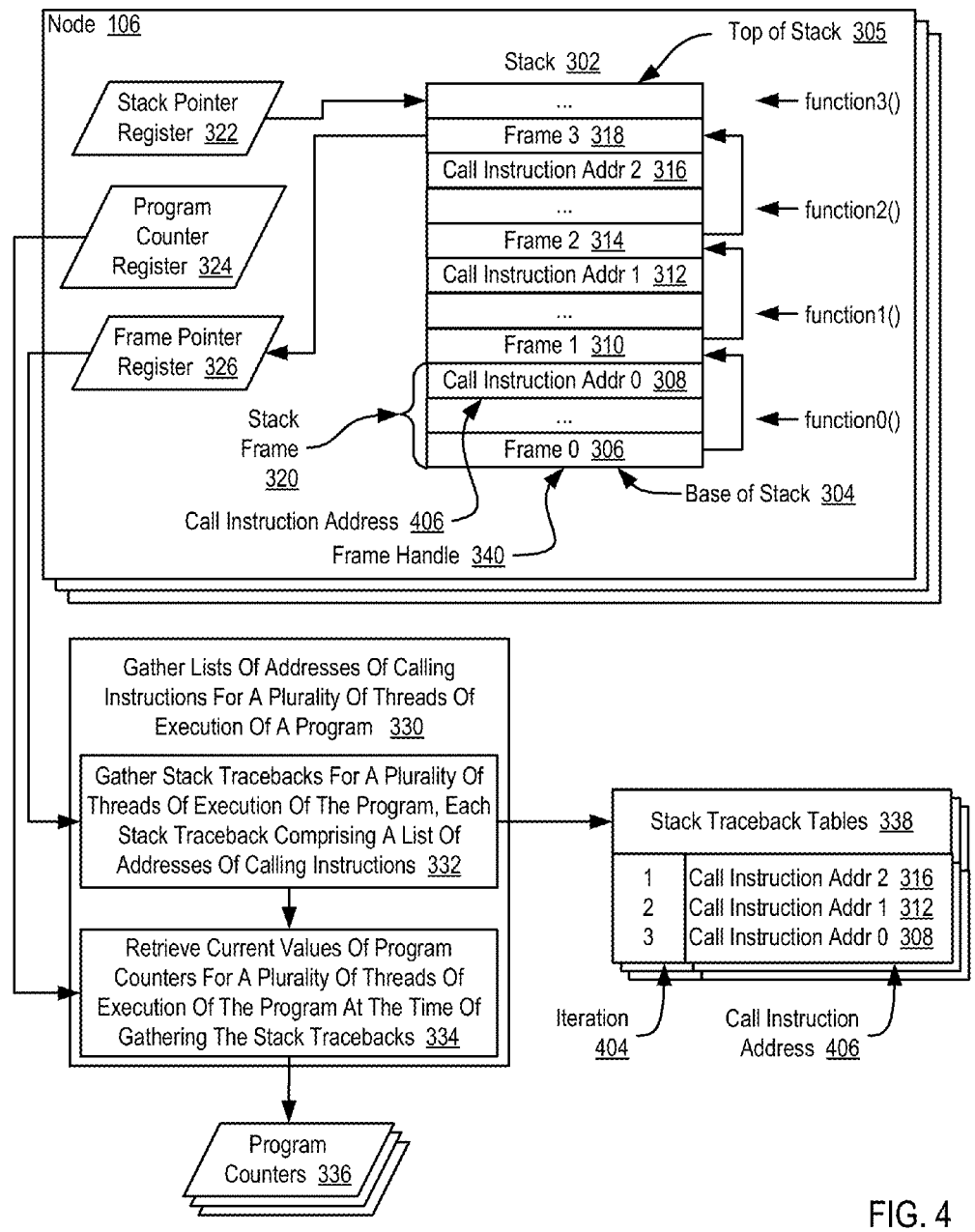
FIG. 4 sets forth a flow chart illustrating an exemplary node and an exemplary method for gathering lists of addresses of calling instructions for a plurality of threads of execution of the program useful in debugging a high performance computing program according to embodiments of the present invention.

For further explanation, FIG. 4 sets forth a flow chart illustrating an exemplary node (106) and an exemplary method for gathering (330) lists of addresses (308, 312, 316) of calling instructions for a plurality of threads of execution of the program used to explain debugging a high performance computing program according to embodiments of the present invention. In the method of FIG. 4, gathering (330) lists of addresses (308, 312, 316) of calling instructions for a plurality of threads of execution of a high performance computing program includes gathering (332) stack tracebacks for a plurality of threads of execution of a high performance computing program. In the example of FIG. 4, each stack traceback includes a list of addresses (308, 312, 316) of calling instructions. A stack traceback is a series of stack frames on a stack that provides a traceable history of all previous functions called in the current execution tree. Gathering (332) stack tracebacks for a plurality of threads of execution of a high performance computing program may be carried out by storing the gathered stack tracebacks for a plurality of threads of execution of a high performance computing program in stack traceback tables (338) for each thread of execution. The stack traceback tables (338) associate an iteration (404) with an address (406) of a calling instruction. The iteration (404) represents a stack frame in a stack created during execution of a thread of a high performance computing program from which an address of a calling instruction is gathered (330). The address (406) of a calling instruction represents the location in computer memory of a calling instruction in a function represented by a stack frame.

A calling instruction is a computer program instruction that transfers execution control of a processor from one function of a program to another function. A calling instruction typically corresponds to a return instruction. A return instruction is a computer program instruction that returns execution control of a processor to the function that contains the corresponding calling instruction. The following segment of pseudocode illustrates examples of calling instructions and return instructions.

| 1 | function0( ) | //calling instruction |
| 2 | { | |
| 3 | function1( ) | //calling instruction |
| 4 | { | |
| 5 | function2( ) | //calling instruction |
| 6 | { | |

```
 7            function3( )   //calling instruction
 8            {
 9                   return;  //return instruction
10            }
11                   return;  //return instruction
12        }
13               return;      //return instruction
14        }
15          return;            //return instruction
16    }
```

This example is said to be 'pseudocode' because the example is an explanation, rather than a working model, that is set forth in the form of computer source code. This example demonstrates calling instructions and return instructions useful in debugging a high performance computing program according to embodiments of the present invention. In the example above, line 1 of the pseudocode depicts a calling instruction that transfers execution control to 'function0( ).' Similarly, line 3 of the pseudocode depicts a calling instruction that transfers execution control from 'function0( )' to 'function1( ).' Line 5 of the pseudocode depicts a calling instruction that transfers execution control from 'function1( )' to 'function2( ).' Line 7 of the pseudocode depicts a calling instruction that transfers execution control from 'function2( )' to 'function3( ).' Line 9 of the pseudocode depicts a return instruction from 'funtion3( )' that returns execution control to 'funtion2( ).' Line 11 of the pseudocode depicts a return instruction from 'funtion2( )' that returns execution control to 'funtion1( ).' Line 13 of the pseudocode depicts a return instruction from 'funtion1( )' that returns execution control to 'funtion0( ).' Line 15 of the pseudocode depicts a return instruction from 'funtion0( )' that transfers execution control to the function containing the calling instruction depicted in line 1. In this specification, a function containing a calling instruction is referred to as a 'calling function.' In the example above, therefore, 'function0( ),' 'function1( ),' and 'function2( )' are calling functions. Readers of skill in the art will recognize that the computer source code in this example is presented in-line. Such a presentation is purely for purposes of explanation. The return instruction for the 'function0( )' calling instruction would normally occur at line 4 instead of line 15. Similarly, the instruction for the 'function1( )' calling instruction would normally occur at line 6 instead of line 13, and the instruction for the 'function2( )' calling instruction would normally occur at line 8 instead of line 11.

To keep track of the calling instructions and return instructions in a thread of execution, the node (106) in the example of FIG. 4 includes a stack (302) for the thread. Stack (302) is a data storage and control-flow structure that stores information regarding the current execution state of the functions of a thread of execution. Each function's execution state is represented in stack (302) using a data structure called a stack frame (320). The stack (302) operates using a Last In First Out ('LIFO') principle. As the processor executes a calling instruction, the processor creates a stack frame representing the function called by the calling instruction on the top of the stack. When the processor executes a return instruction of a function, the processor removes the stack frame representing the function from the top of the stack and resumes executing the function represented by the next stack frame at the top of the stack at the return point stored in the stack frame. In the example of FIG. 4, stack (302) contains stack frames representing the functions 'function0( ),' 'function1( ),' function2( ),' and 'function3( )' discussed above.

Each stack frame (320) in the example of FIG. 4 includes a frame handle (340). A frame handle is location in computer memory that represents the location in the stack (302) of a stack frame representing a function. In the example of FIG. 4, the frame handles of function0( ), function1( ), function2( ) and function3( ) in stack (302) are represented by Frame 0 (306), Frame 1 (310), Frame 2 (314), and Frame 3 (318) respectively. The frame handle (340) of a stack frame (320) stores a frame pointer to the frame handle of the adjacent stack frame closer to the base (304) of the stack. A frame pointer is an address in computer memory of the location of the beginning of a stack frame associated with an instance of a function. Each stack frame in the stack (302) therefore is linked to the preceding stack frame. In the example of FIG. 4, Frame 3 (318) stores a frame pointer to Frame 2 (314), Frame 2 (314) stores a frame pointer to Frame 1 (310), and Frame 1 (310) stores a frame pointer to Frame 0 (306). Because Frame 0 (306) is a frame handle to the stack frame at the base (304) of the stack (302), no frame handle of a previous frame exists to which Frame 0 (306) may point. Frame 0 (306) may therefore store a value of '0' to indicate that Frame 0 (0) is the base (304) of the stack.

Each stack frame (320) in the example of FIG. 4 also includes an address (406) of a calling instruction. The address (406) of a calling instruction is the location in computer memory of a calling instruction. When a processor executes a calling instruction, the processor pushes the address of the calling instruction onto the top of the stack before creating a new frame on the top of the stack to represent the function called by the calling instruction. The address of the calling instruction is stored as part of the stack frame representing the calling function. The address of the calling instruction provides a return point for resuming execution in the calling function when the processor executes a return instruction in the function called by the calling instruction. In the example of FIG. 4, Call Instruction Address 0 (308) is the return point for the function represented by the stack frame having a frame handle at Frame 0 (306), Call Instruction Address 1 (312) is the return point for the function represented by the stack frame having a frame handle at Frame 1 (310), and Call Instruction Address 2 (316) is the return point for the function represented by the stack frame having a frame handle at Frame 2 (314). The stack frame having a frame handle at Frame 3 (318) does not have an address of a calling instruction because processor is executing the function represented by the stack frame having a frame handle at Frame 3 (318). That is, the processor has not executed a calling instruction in the function represented by the stack frame having a frame handle at Frame 3 (318). Although the example of FIG. 4 depicts stack frames containing only a frame handle and address of a calling instruction, such a depiction is for explanation and not for limitation. In fact, stack frames useful in debugging a high performance computing application may also contain current values for the registers of a processor, arguments and local variables for the functions represented by the stack frames, local variable of the function represented by the previous stack frame, and so on.

In the example of FIG. 4, node (106) includes a frame pointer register (326), a stack pointer register (322), and a program counter register (324). The frame pointer register (326) represents a register in the processor of a node that stores the address in computer memory of the frame handle for the stack frame at the top (305) of the stack. The frame pointer register (326) provides a reference point for a processor to access the data contained in the stack frame at the top (305) of the stack (302) using offsets from the value of the frame pointer register (326). The stack pointer register (322)

represents a register in the processor of a node that stores the address in computer memory of the top of the stack (302). When a processor pushes data onto the stack (302), the processor first increases the value of the stack pointer register (322) by one and then stores the new top value into the location stored in the stack pointer register (322). When a processor pops data off of the stack (302), the processor first reads the top value from the location stored in the stack pointer register (322) and then decreases the value of the stack pointer register (322) by one. The program counter register (324) represents a register in the processor of a node that stores the address in computer memory of the next computer program instruction for execution by the processor.

In the example of FIG. 4, gathering (332) the stack tracebacks from each thread may be carried out by iteratively traversing through the stack frames in the stack of each thread and reading the address of the calling instruction of each stack frame. The iterative traversal through the stack frames begin at the frame handle of the stack frame at the top of the stack (302) located at the address stored in the frame pointer register (326). A value of '0' for the iteration (404) marks the beginning point of the iterative traversal through the stack (302) and therefore corresponds to the top stack frame in the stack (302). In the first iteration, the address stored in the frame handle of the stack frame at the top of the stack (302) points to the frame handle of the second stack frame from the top of the stack. A value of '1' for the iteration (404) therefore corresponds to the second stack frame from the top of the stack (302). In the second iteration, the address stored in the frame handle of the second stack frame from the top of the stack (302) points to the frame handle of the third stack frame from the top of the stack (302). A value of '2' for the iteration (404) therefore corresponds to the third stack frame from the top of the stack (302). In the third iteration, the address stored in the frame handle of the third stack frame from the top of the stack (302) points to the frame handle of the fourth stack frame from the top of the stack (302), and so on until the base (304) of the stack (302) is reached as indicated by a value of '0' stored in frame handle at the base (304) of the stack (302). In stack traceback tables (338) in the example of FIG. 4, a value for the iteration (404) of '1' represents the stack frame having a frame handle at Frame 2 (314), a value for the iteration (404) of '2' represents the stack frame having a frame handle at Frame 1 (310), and a value for the iteration (404) of '3' represents the stack frame having a frame handle at Frame 0 (308).

As the gathering (332) step iteratively traverses the stack frames of a stack, gathering (332) the stack tracebacks from each thread may be carried out by reading the address of the calling instruction of a stack frame at the memory location obtained by subtracting the size of a frame handle storage location from the frame handle of a stack frame. In the example of FIG. 4, the value of Call Instruction Address 2 (316) is read from the location obtained by subtracting the size of a frame handle storage location from Frame 3 (318). Similarly, the value of Call Instruction Address 1 (312) is read from the location obtained by subtracting the size of a frame handle storage location from Frame 2 (314). The value of Call Instruction Address 0 (308) from the location obtained by subtracting the size of a frame handle storage location from Frame 1 (310). In the example of FIG. 4, gathering (332) the stack tracebacks from each thread therefore stores Call Instruction Address 0 (308), Call Instruction Address 1 (312), and Call Instruction Address 2 (316) from the stack (306) into the stack traceback table (338) corresponding to a thread executing on a processor of node (106).

In the method of FIG. 4, gathering (330) lists of addresses (308, 312, 316) of calling instructions for a plurality of threads of execution of a high performance computing program also includes retrieving (334) current values of program counters (324) for a plurality of threads of execution of the program at the time of gathering the stack tracebacks. A debugger may store the retrieved current values of program counters in program counters (336). Program counters (336) represent the program counter registers of each processor executing a thread of execution of a high performance computing program.

Figure 5:
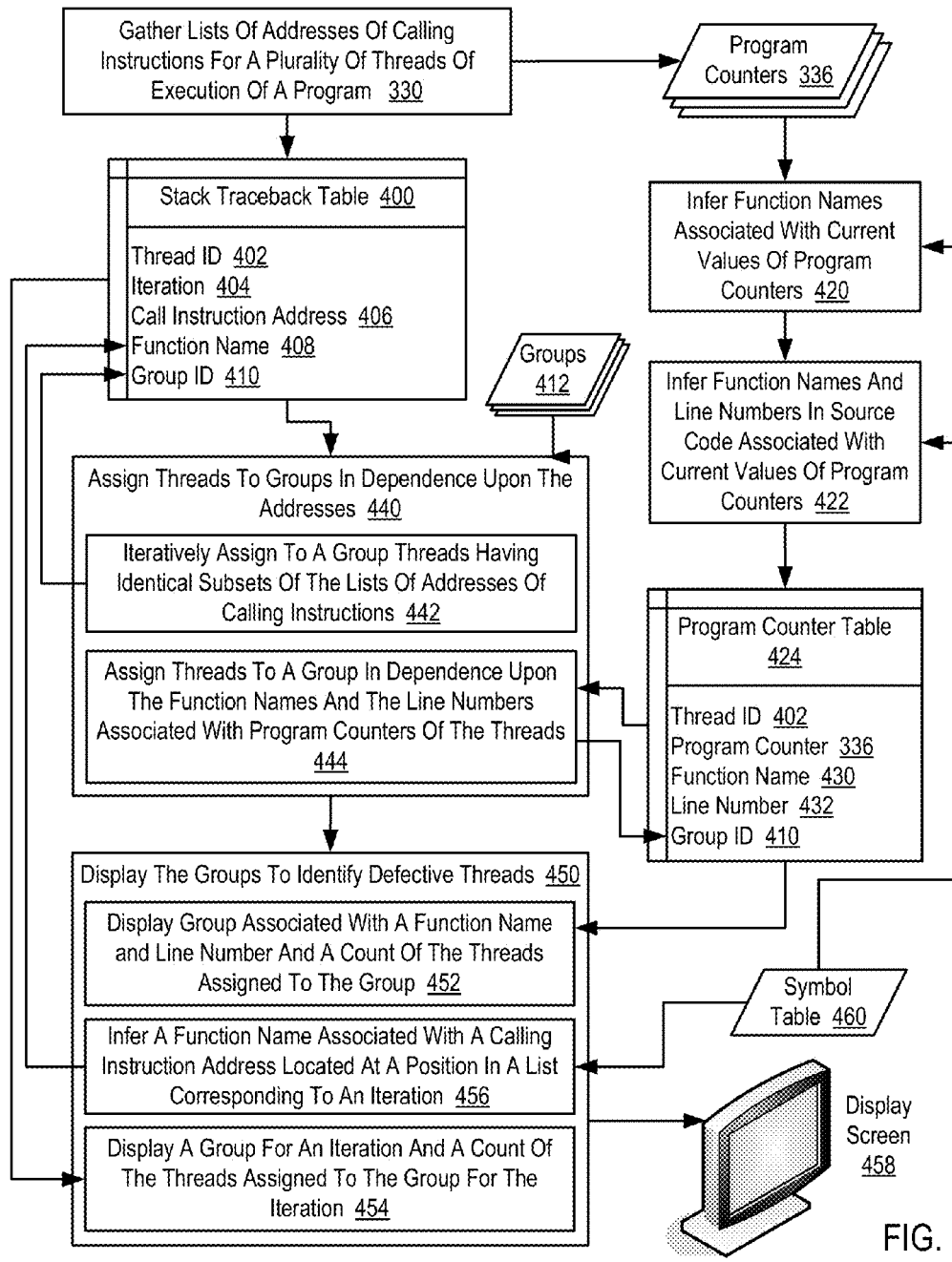
FIG. 5 sets forth a flow chart illustrating a further exemplary method for debugging a high performance computing program according to embodiments of the present invention.

For further explanation, FIG. 5 sets forth a flow chart illustrating a further exemplary method for debugging a high performance computing program according to embodiments of the present invention that includes gathering (330) lists of addresses (406) of calling instructions for a plurality of threads of execution of a high performance computing program. Gathering (330) lists of addresses (406) of calling instructions for a plurality of threads of execution of a high performance computing program may be carried out by gathering stack tracebacks for a plurality of threads of execution of the program in the manner described with reference to FIG. 4. Each stack traceback in the example of FIG. 5 includes a list of addresses (406) of calling instructions. Gathering (330) lists of addresses (406) of calling instructions for a plurality of threads of execution of a high performance computing program may be carried out by storing the gathered stack tracebacks for a plurality of threads of execution of the program into a stack traceback table (400).

The example of FIG. 5 includes a stack traceback table (400) that associates a thread identifier (402) with an iteration (404), an address of a call instruction (406), a function name (408), and a group identifier (410). The thread identifier (402) represents a thread of a high performance computing program executing on a processor of a node. The iteration (404) represents a stack frame in a stack created during execution of a thread of a high performance computing program from which an address of a calling instruction is gathered (330). The address (406) of a calling instruction represents the location in computer memory of a calling instruction in a function represented by a stack frame. The function name (408) represents the symbolic name assigned to a function in computer source code. The group identifier (410) represents the group (412) to which a thread is assigned in dependence upon the addresses (406) of the calling instructions associated with the thread identifier (402) of the thread.

In the example of FIG. 5, gathering (330) lists of addresses (406) of calling instructions for a plurality of threads of execution of a high performance computing program may be carried out by retrieving current values of program counters for a plurality of threads of execution of the program at the time of gathering the stack tracebacks in the manner described with reference to FIG. 4. Retrieving current values of program counters for a plurality of threads of execution of the program at the time of gathering the stack tracebacks may be carried out by storing the retrieved current values of program counters in program counters (336). Program counters (336) represent the program counter registers of each processor executing a thread of execution of a high performance computing program.

The method of FIG. 5 also includes inferring (420) function names (430) associated with the current values of the program counters (336). Inferring (420) function names (430) associated with the current values of the program counters (336) may be carried out using a symbol table (460). The symbol table (460) is a table or group of tables that provide a mapping between the symbolic names and statements within computer source code and the memory locations of the computer machine code derived from those symbolic names and statements. The symbol table (460) is typically generated during the compilation and linking process of computer source code. Symbol table (460) may provide a variety of useful mapping features. Symbol table (460) may provide mapping between an address of a computer program instruction and the source statement in computer source code. Symbol table (460) may also provide mapping between a data address and a statically allocated variable to show the name of the variable assigned to the address. In addition, symbol table (460) may provide mapping between a source statement in computer source code and an instruction address range to provide the ability to step through a source statement. Using a symbol table, therefore, inferring (420) function names (430) associated with the current values of the program counters (336) may be carried out by looking up the current values of the program counters (336) in the symbol table and retrieving the function names (430) associated with the range of addresses containing the current values of the program counters (336).

The method of FIG. 5 also includes inferring (422) function names (430) and line numbers (432) in source code associated with the current values of the program counters (336). Similar in operation to inferring (420) function names (430) discussed above, inferring (422) function names (430) and line numbers (432) in source code associated with the current values of the program counters (336) may be carried out using the symbol table (460). Inferring (420) function names (430) and line numbers (432) associated with the current values of the program counters (336) may be carried out by looking up the current values of the program counters (336) in the symbol table (460) and retrieving the function names (430) and line numbers (432) associated with the current values of the program counters (336). In the example of FIG. 5, inferring (422) function names (430) and line numbers (432) in source code associated with the current values of the program counters (336) may be carried out by storing the inferred function names (430) and line numbers (432) in a program counter table (424).

The example of FIG. 5 includes a program counter table (424) that associates a thread identifier (402) with a program counter (336), a function name (430), a line number (432), and a group identifier (410). The thread identifier (402) represents a thread of a high performance computing program executing on a processor of a node. The program counter (336) represents a program counter register of a processor executing a thread of execution of a high performance computing program. The function name (430) represents the symbolic name assigned to a function in computer source code that maps to the computer program instruction located at the address contained in the program counter (336). The group identifier (410) represents the group (412) to which a thread is assigned in dependence upon the function name (430) associated with the thread identifier (402) of the thread.

The method of FIG. 5 also includes assigning (440) the threads to groups (412) in dependence upon the addresses (406). Groups (412) represent the groups to which a thread of execution is assigned. Groups (412) may be implemented for threads associated with the same addresses (406) of calling instructions, the same function name (408), the same line number (432), and so on.

In the method of FIG. 5, assigning (440) the threads to groups (412) in dependence upon the addresses (406) includes iteratively assigning (442) to a group (412) threads having identical subsets of the lists of addresses (406) of calling instructions. Readers will recall that the iteration (404) represents a stack frame in a stack from which an address of a calling instruction is gathered (330). Iteratively assigning (442) to a group (412) threads having identical subsets of the lists of addresses (406) of calling instructions may be carried out by identifying the values for the address (406) of a calling instruction associated with the same value for iteration (404) and assigning the threads having the same value for the address (406) of a calling instruction to the same group (412) using group identifier (410). If a group (412) does not exist for a particular value of the address (406) of a calling instruction, the step of iteratively assigning (442) may be carried out by creating a group (412) for threads having the particular value for the address (406) of a calling instruction. After assigning the threads to groups (412) using a first value for iteration (404), the step of iteratively assigning (442) may then be carried out by assigning the threads to groups (412) using the next value for iteration (404), and so on until the threads to groups (412) using all values for iteration (404) have been assigned.

In the method of FIG. 5, assigning (440) the threads to groups (412) in dependence upon the addresses (406) also includes assigning (444) threads to a group (412) in dependence upon the functions names (430) and line numbers (432) associated with program counters (336) of the threads. Assigning (444) threads to a group (412) in dependence upon the functions names (430) and line numbers (432) associated with program counters (336) of the threads may be carried out by assigning threads having the same value for the function name (430) and the same value for the line number (432) to the same group (412) using group identifier (410). If a group (412) does not exist for a particular value for the function name (430) and a particular value for the line number (432), the step of assigning (444) may be carried out by creating a group (412) for threads having the particular value for the function name (430) and the particular value for the line number (432).

The method of FIG. 5 also includes displaying (450) the groups (412) to identify defective threads. A defective thread is a thread of execution executing in a manner different than other similar threads executing in a high performance computing environment. Defective threads may exist because of software or hardware defects. In the method of FIG. 5, displaying (450) the groups (412) to identify defective threads includes displaying (452) a group (412) associated with a function name (430) and a line number (432) and a count of the threads assigned to the group (412) associated with the function name (430) and the line number (432). Displaying (452) a group (412) associated with a function name (430) and a line number (432) and a count of the threads assigned to the group (412) associated with the function name (430) and the line number (432) may be carried out using a graphical user interface displayed on display screen (458). In the example of FIG. 5, displaying (452) a group (412) associated with a function name (430) and a line number (432) and a count of the threads assigned to the group (412) associated with the function name (430) and the line number (432) may include sorting the displayed groups (412) according to the count of the threads assigned to the group (412).

In the method of FIG. 5, displaying (450) the groups (412) to identify defective threads also includes inferring (456) a function name (408) associated with a calling instruction address (406) located at a position in a list corresponding to an iteration (404). Inferring (456) a function name (408) associated with a calling instruction address (406) located at a position in a list corresponding to an iteration (404) may be carried out using symbol table (460). Using symbol table (460), inferring (456) function names (408) associated with a calling instruction address (406) located at a position in a list corresponding to an iteration (404) may be carried out by looking up the current values of the calling instruction address (406) in the symbol table and retrieving the function names (430) associated with a calling instruction address (406). In the example of FIG. 5, inferring (456) a function name (408) associated with a calling instruction address (406) located at a position in a list corresponding to an iteration (404) may be carried out by storing the inferred function names (408) in the stack traceback table (400).

In the method of FIG. 5, displaying (450) the groups (412) to identify defective threads includes displaying (454) a group (412) for an iteration (404) and a count of the threads assigned to the group (412) for the iteration (404). Displaying (454) a group (412) for an iteration (404) and a count of the threads assigned to the group (412) for the iteration (404) may be carried out using a graphical user interface displayed on display screen (458). In the example of FIG. 5, displaying (454) a group (412) for an iteration (404) and a count of the threads assigned to the group (412) for the iteration (404) may include sorting the displayed groups (412) according to the count of the threads assigned to the group (412).

Figure 6:
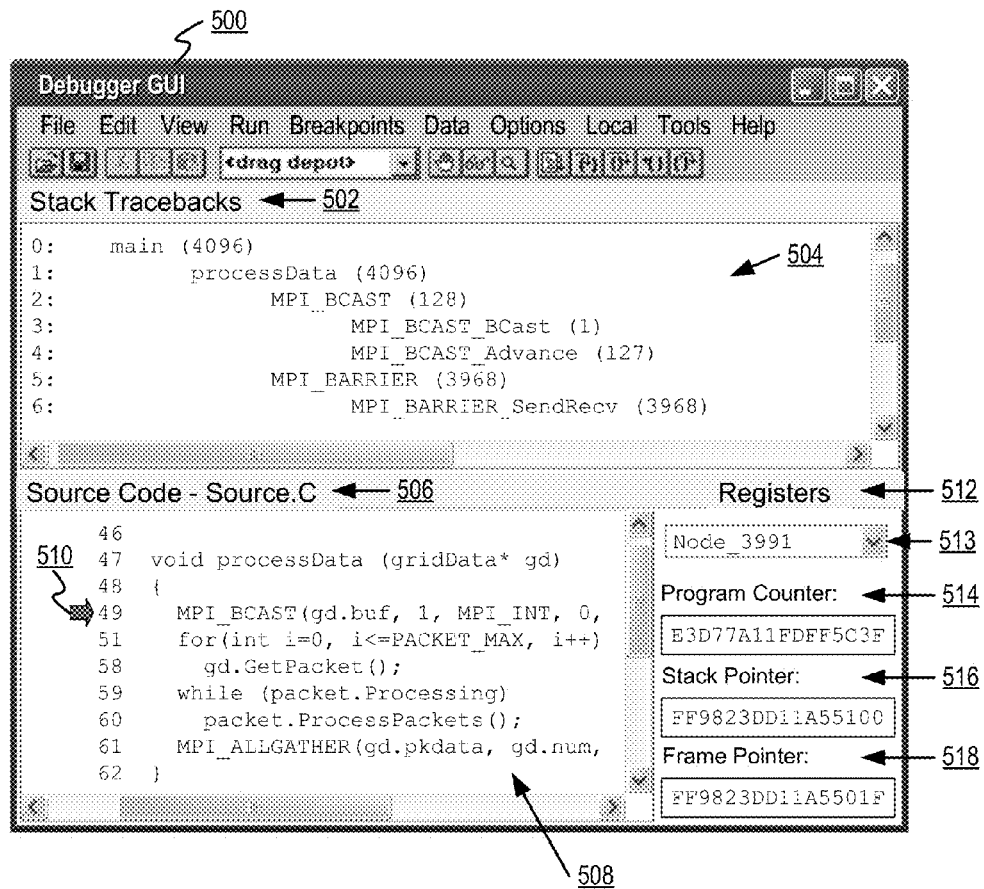
FIG. 6 sets forth a line drawing of an example of a graphical user interface useful in debugging a high performance computing program according to embodiments of the present invention.

For further explanation of displaying groups to identify defective threads, FIG. 6 sets forth a line drawing of an example of a graphical user interface ('GUI') (500) useful in debugging a high performance computing program according to embodiments of the present invention. In the example of FIG. 6, GUI (500) includes a stack tracebacks section (502). The stack traceback section (502) of GUI (500) provides a stack traceback text box (504) in which the GUI (500) displays groups of threads assigned to groups in dependence upon addresses of calling instructions or in dependence upon the function name associated with the current values of program counter registers. In the example of FIG. 6, the GUI (500) displays the groups for an iteration and a count of the threads assigned to the group for the iteration.

In the stack traceback text box (504) of the example of FIG. 6, numbered lines 3, 4, and 6 depict function names associated with the current values of program counters of threads of a high performance computing program. Line 3 of text box (504) indicates that the program counter register of one node of the 4096 nodes in the high performance computing environment contains the address of a computer program instruction in the 'MPI_BCAST_BCast' function. Line 4 of text box (504) indicates that the program counter register of 127 nodes of the 4096 nodes in the high performance computing environment contained the address of a computer program instruction in the 'MPI_BCAST_Advance' function. Line 5 of text box (504) indicates that the program counter register of 3968 nodes of the 4096 nodes in the high performance computing environment contained the address of a computer program instruction in the 'MPI_BARRIER_SendRecv' function.

In the stack traceback text box (504) of the example of FIG. 6, numbered lines 2 and 5 depict function names associated with values of calling instruction addresses located at a position in a list corresponding to the first iteration through the stacks of threads of a high performance computing program. Line 2 of text box (504) indicates that the calling instruction address of 128 nodes of the 4096 nodes in the high performance computing environment contained the address of a computer program instruction in the 'MPI_BCAST' function. Line 5 of text box (504) indicates that the calling instruction address of 3968 nodes of the 4096 nodes in the high performance computing environment contained the address of a computer program instruction in the 'MPI_BARRIER' function.

In the stack traceback text box (504) of the example of FIG. 6, numbered line 1 depicts function names associated with values of calling instruction addresses located at a position in a list corresponding to the second iteration through the stacks of threads of a high performance computing program. Line 1 of text box (504) indicates that the calling instruction address of 4096 nodes of the 4096 nodes in the high performance computing environment contained the address of a computer program instruction in the 'processData' function.

In the stack traceback text box (504) of the example of FIG. 6, numbered line 0 depicts function names associated with values of calling instruction addresses located at a position in a list corresponding to the third iteration through the stacks of threads of a high performance computing program. Line 0 of text box (504) indicates that the calling instruction address of 4096 nodes of the 4096 nodes in the high performance computing environment contained the address of a computer program instruction in the 'main' function.

In the example of FIG. 6, GUI (500) includes a source code section (506). The source code section (506) of GUI (500) provides a source code text box (508) in which a debugger displays source code that includes function names and line numbers associated with current values of the program counters of threads of a high performance computing program. In the example of FIG. 6, cursor (510) of source code text box (508) points to the 'MPI_BCAST' function and 'line 49' of the source code inferred from the value of the program counter register (514).

In the example of FIG. 6, GUI (500) includes a registers section (512) for displaying information regarding the current state of the registers of a processor of a node running a high performance computing program. The registers section (512) of a GUI (500) displays a current node drop down list (513). A user operates the current node drop down list (513) to display the registers of the processor of the selected node executing a thread of the high performance computing program. The registers section (512) of a GUI (500) displays a program counter register (512), a stack pointer register (516), and a frame pointer register (518). The program counter register (512) represents a register in the processor of the node selected in the current node drop down list (513) that stores the address in computer memory of the next computer program instruction for execution by the processor. In the example of FIG. 6, a GUI (500) displays retrieved current values of program counters for a plurality of threads of execution of a high performance computing program at the time of gathering the stack tracebacks depicted in a stack tracebacks section (502). The stack pointer register (516) represents a register in the processor of the node selected in the current node drop down list (513) that stores the address in computer memory of the top of the stack. The frame pointer register (518) represents a register in the processor of the node selected in the current node drop down list (513) that stores the address in computer memory of the frame handle for the stack frame at the top of the stack.

Exemplary embodiments of the present invention are described largely in the context of a fully functional computer system for debugging a high performance computing program. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for debugging a high performance computing program, the method comprising:
   assigning a plurality of threads executing the program to groups in dependence upon addresses of calling instructions for the plurality of threads including iteratively assigning to a group threads having identical subsets of the lists of addresses of calling instructions; and
   displaying the groups to identify defective threads including displaying the groups to identify defective threads further comprises displaying a group for an iteration and a count of the threads assigned to the group for the iteration.

2. The method of claim 1 wherein gathering lists of addresses of calling instructions for a plurality of threads of execution of the program further comprises:
   gathering stack tracebacks for a plurality of threads of execution of the program, each stack traceback comprising a list of addresses of calling instructions; and
   retrieving current values of program counters for a plurality of threads of execution of the program at the time of gathering the stack tracebacks.

3. The method of claim 2 further comprising inferring function names associated with the current values of the program counters.

4. The method of claim 2 further comprising inferring function names and line numbers in source code associated with the current values of the program counters.

5. The method of claim 1 wherein displaying the groups to identify defective threads further comprises inferring a function name associated with a calling instruction address located at a position in a list corresponding to an iteration.

6. An apparatus for debugging a high performance computing program, the apparatus comprising a computer processor, a computer memory operatively coupled to the computer processor, the computer memory having disposed within it computer program instructions capable of:
   assigning a plurality of threads executing the program to groups in dependence upon addresses of calling instructions for the plurality of threads including iteratively assigning to a group threads having identical subsets of the lists of addresses of calling instructions; and
   displaying the groups to identify defective threads including displaying the groups to identify defective threads further comprises displaying a group for an iteration and a count of the threads assigned to the group for the iteration.

7. The apparatus of claim 6 wherein gathering lists of addresses of calling instructions for a plurality of threads of execution of the program further comprises:
   gathering stack tracebacks for a plurality of threads of execution of the program, each stack traceback comprising a list of addresses of calling instructions; and
   retrieving current values of program counters for a plurality of threads of execution of the program at the time of gathering the stack tracebacks.

8. The apparatus of claim 7 further comprising computer program instructions capable of inferring function names associated with the current values of the program counters.

9. The apparatus of claim 6 wherein displaying the groups to identify defective threads further comprises displaying a group for an iteration and a count of the threads assigned to the group for the iteration.

10. A computer program product for debugging a high performance computing program, the computer program product disposed upon a computer readable recordable medium, wherein the computer readable recordable medium is not a signal, the computer program product comprising computer program instructions capable of:
    assigning a plurality of threads executing the program to groups in dependence upon addresses of calling instructions for the plurality of threads including iteratively assigning to a group threads having identical subsets of the lists of addresses of calling instructions; and
    displaying the groups to identify defective threads including displaying the groups to identify defective threads further comprises displaying a group for an iteration and a count of the threads assigned to the group for the iteration.

11. The computer program product of claim 10 wherein gathering lists of addresses of calling instructions for a plurality of threads of execution of the program further comprises:
    gathering stack tracebacks for a plurality of threads of execution of the program, each stack traceback comprising a list of addresses of calling instructions; and
    retrieving current values of program counters for a plurality of threads of execution of the program at the time of gathering the stack tracebacks.

12. The computer program product of claim 11 further comprising computer program instructions capable of inferring function names associated with the current values of the program counters.

* * * * *